Nov. 26, 1968  R. P. DONOVAN  3,413,029
MATERIAL HANDLING APPARATUS
Filed Aug. 1, 1966  5 Sheets-Sheet 1
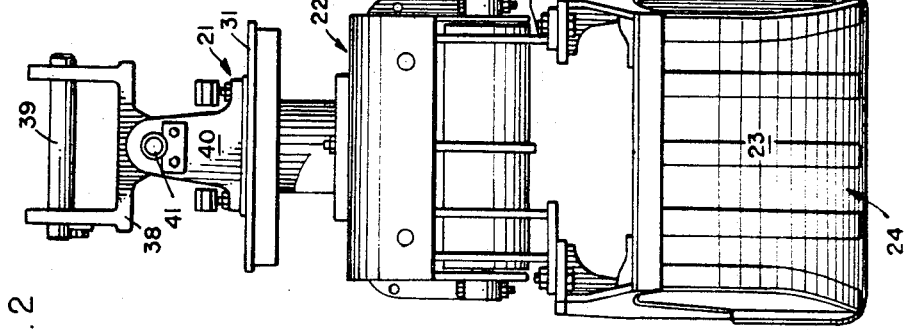
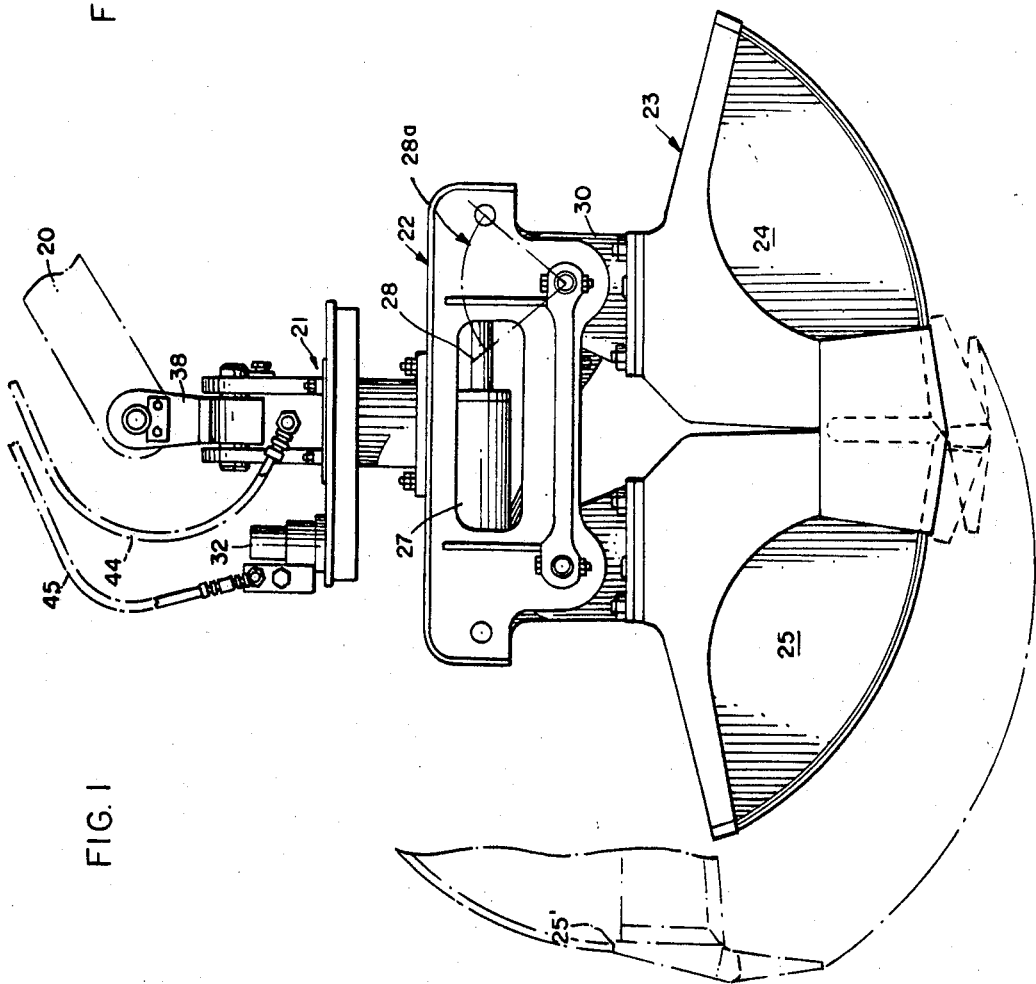
INVENTOR:
ROBERT P. DONOVAN
BY
Dawson, Tilton, Fallon, Lungmus & Alexander
ATT'YS INVENTOR:
ROBERT P. DONOVAN
BY
Dawson, Tilton, Fallon, Lungmus & Alexander
ATT'YS Nov. 26, 1968    R. P. DONOVAN    3,413,029

MATERIAL HANDLING APPARATUS

Filed Aug. 1, 1966    5 Sheets-Sheet 3

INVENTOR:
ROBERT P. DONOVAN
BY
Dawson, Tilton, Fallon, Lungmus & Alexander
ATT'YS Nov. 26, 1968   R. P. DONOVAN   3,413,029
MATERIAL HANDLING APPARATUS
Filed Aug. 1, 1966   5 Sheets-Sheet 4
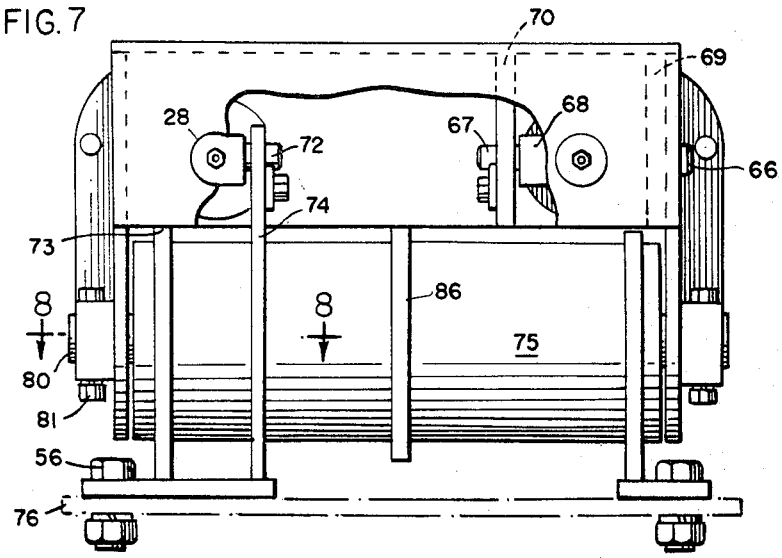
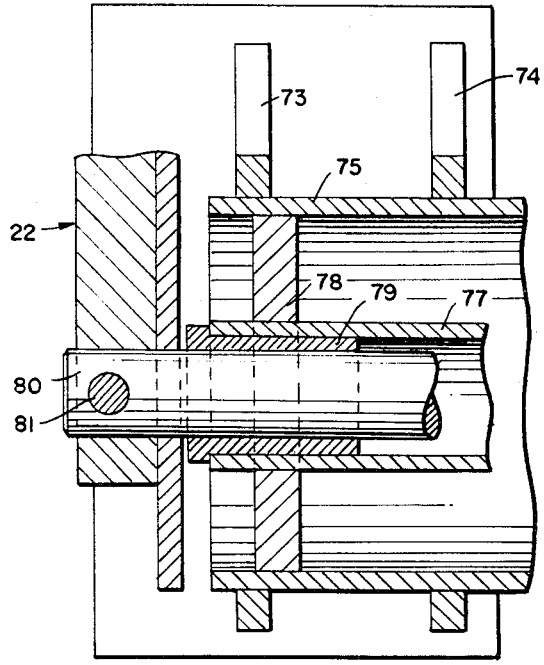
INVENTOR:
ROBERT P. DONOVAN
BY
Dawson, Tilton, Fallon, Lungmus, Alexander
ATT'YS

INVENTOR:
ROBERT P. DONOVAN

United States Patent Office 3,413,029
Patented Nov. 26, 1968

3,413,029
MATERIAL HANDLING APPARATUS
Robert P. Donovan, Danville, Ill., assignor to Esco Corporation, Portland, Oreg., a corporation of Oregon
Filed Aug. 1, 1966, Ser. No. 569,421
3 Claims. (Cl. 294—70)

ABSTRACT OF THE DISCLOSURE

Actuator coupling for connecting a grapple or clamshell to a boom, the actuator coupling including a generally rectangular frame having opposed, side-by-side cylinder and piston rod units connected to arms at respective ends of the actuator coupling frame, the arms in turn being coupled to pivot shafts on the frame with the arms replaceably carrying the clamshells, grapples, etc. The entire coupling is rotatable through 360° and is equipped with interconnected torque tubes to balance the operation.

---

A principal object of the invention is to provide material handling apparatus of a substantial and rugged character which is adapted to handle a variety of products through the interchangeability of the grasping means, i.e., clam shell bowls, grapples, etc. Another object is to provide in the above-described apparatus dual hydraulic cylinders for achieving simultaneous and synchronous action of the grasping part. Still another object is to provide a unique torque tube arrangement in the basic frame of the apparatus to implement the advantageously rugged nature and further wherein the torque tubes are interconnected by means of a mechanical equalizing link to further insure synchronous operation of the grasping means.

A further important object is to provide material handling apparatus of the grasping type which is equipped with a swivel connection adapted for continuous rotation, i.e., over successive 360° arcs to facilitate the grasping operation.

Other objects and advantages of the invention may be seen in the details of construction and operation set down in this specification.

The invention is described in conjunction with an illustrative embodiment in the accompanying drawing, in which:

FIG. 1 is an elevational view of the apparatus equipped with clam shell bowl mounted on a backhoe stick, the latter being shown in fragmentary form and in dotted line;

FIG. 2 is a side elevational view of the showing in FIG. 1;

FIG. 7 is an end elevational view of the showing in FIG. 5;

FIG. 8 is a fragmentary sectional view taken along the line 8—8 as applied to FIG. 7;

Figure 3:
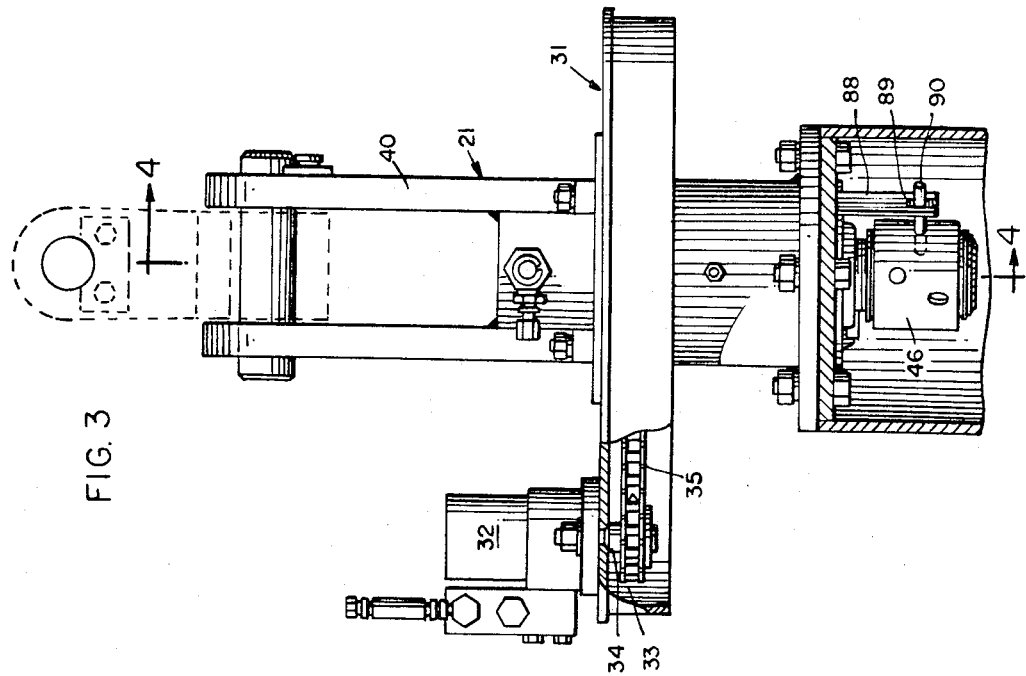
FIG. 3 is a fragmentary elevational view in enlarged scale of the upper portion of FIG. 2 and partly broken away to show certain working parts.

In the illustrations given, and with particular reference to FIG. 1, the numeral 20 designates generally the stick of a hydraulic backhoe to which the grasping apparatus of the invention is adapted for connection. Alternatively, the apparatus may be connected to other pieces of equipment such as a crane.

Still referring to FIG. 1 and proceeding downwardly from the backhoe stick 20, the next general assembly encountered is that generally designated by the numeral 21 and constitutes the connection between the stick 20 and the frame generally designated 22—the frame 22 being that which contains the hydraulic cylinders and piping for the operation of the grasping means which are here generally designated by the numeral 23 and are seen to include a pair of clam shell bowls 24 and 25. Further shown in FIG. 1 is the extreme open condition of the bowl 25 (this being in dotted line) which showing is designated by the numeral 25'.

Figure 5:
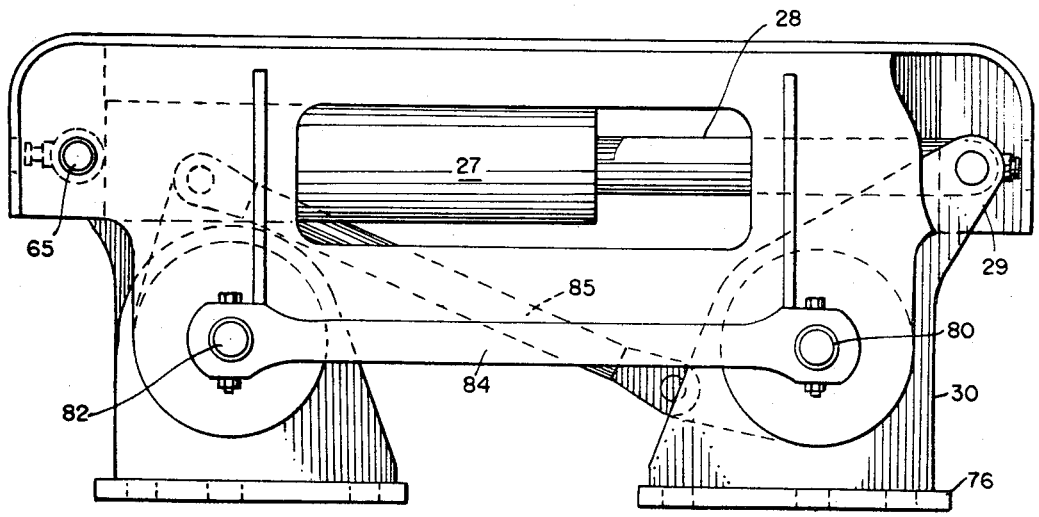
FIG. 5 is an elevational view of the central portion of FIG. 1 showing the material handling apparatus of the invention.
Figure 6:
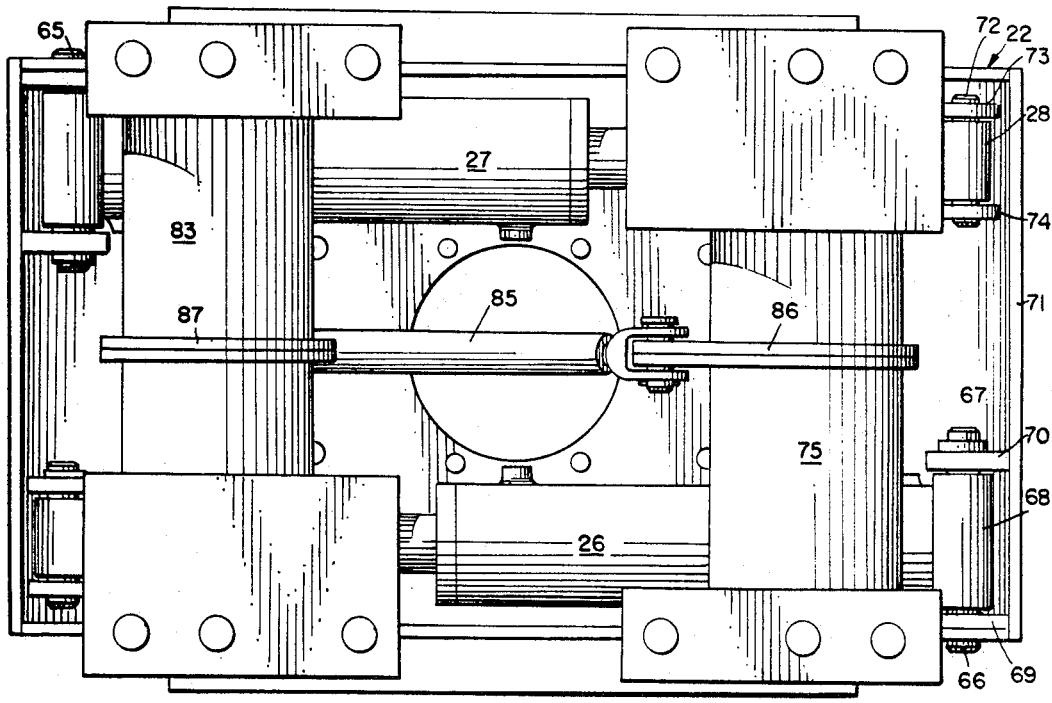
FIG. 6 is a bottom view of the showing in FIG. 5.
Figure 9:
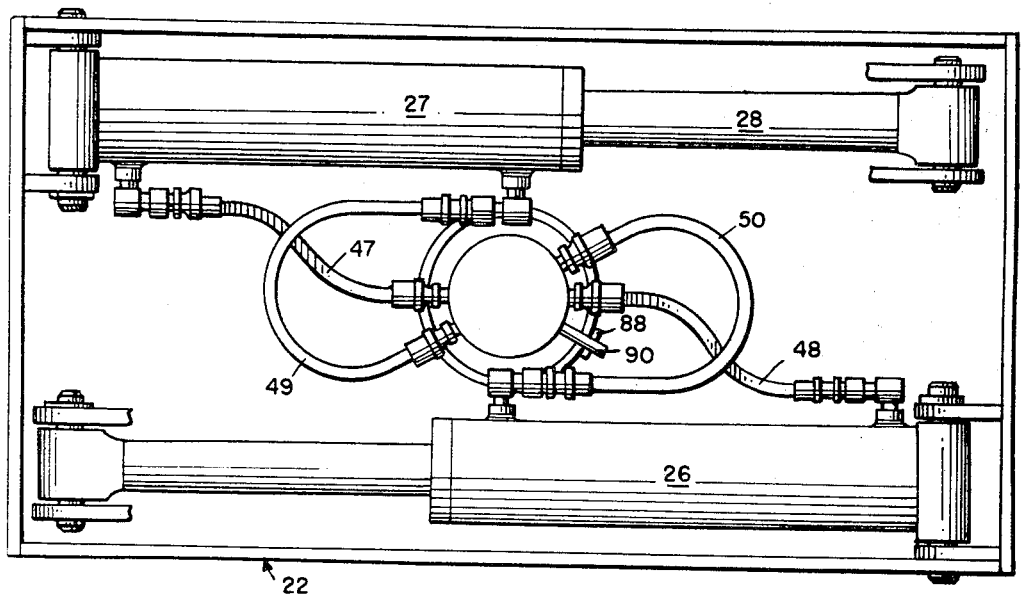
FIG. 9 is a bottom view of the apparatus of FIG. 5, partially cut away and thus corresponds essentially to FIG. 6, but which shows further the piping associated with the hydraulic cylinders.

The operation of the clam shell bowls 23 is achieved through pressurizing of hydraulic cylinder and piston rod units 26 and 27 (see FIG. 6). Referring to FIG. 1, it will be noted that the extension of the piston rod 28 occurs over an arc 28a, the working end of the piston rod 28 being attached to a first lever arm 29 (see FIG. 5) provided as part of the arm member 30—the arm member 30 being the one to which the bowl 24 is attached. Power for achieving the abovementioned movement of arm 30 is achieved through hydraulic pressure fluid introduced into the cylinders of units 26 and 27 in the fashion seen in FIG. 9.

In the illustration given, it is contemplated that the entire frame 22 is rotatable through an arc of 360° through the interposition of the connection 21. The passages for the pressure fluid to achieve this advantageous operation can be seen in FIG. 4 which will be described in detail hereinafter. It will be noted from the consideration of FIGS. 3 and 4 that the connection 21 includes a stationary, i.e., non-rotatable plate assembly generally designated 31 and which supports a hydraulic motor 32. The motor 32 has a sprocket 33 on its depending shaft 34 about which a chain 35 is entrained. The chain 35 also is entrained about a second sprocket 36 (also see FIG. 4) which is fixed to a housing 37. Housing 37 is rotatably mounted relative to the plate assembly 31 and carries the frame 22. Thus the frame 22 is able to be rotated independently of the plate assembly 31.

Referring now to FIG. 1, the numeral 38 designates a swivel connection equipped with a pin 39 for connection to the backhoe stick 20. Projecting upwardly from the plate assembly 31 (see FIG. 2) are a pair of lugs 40 which receive a pin 41 associated with the swivel connection 38. Mounted between the lugs 40 is the upper end of a vertically extending shaft 42 (see particularly FIG. 4). The shaft 42 is equipped with a pair of vertically extending passages 43 and 43a to accommodate the flow of hydraulic fluid, the hydraulic fluid being introduced through hoses (see FIG. 1) associated with the backhoe stick 20. Additionally, hoses 45 are provided for powering the hydraulic motor 32.

The shaft 42 at its lower end is equipped with a rotary seal 46 (see also FIG. 9) to which hoses 47 and 48 are connected for delivering pressure fluid to the butt ends of the cylinders 27 and 26, and with hoses 49 and 50 for delivering pressure fluid to the work or piston rod ends of the units 27 and 26, respectively. The rotary seal 46 is secured in rotatable position on the shaft 42 by means of snap rings 51 and 52. O-rings as at 53, 54 and 55 confine the hydraulic fluid to the particular channels desired for powering the cylinder units 26 and 27.

Figure 10:
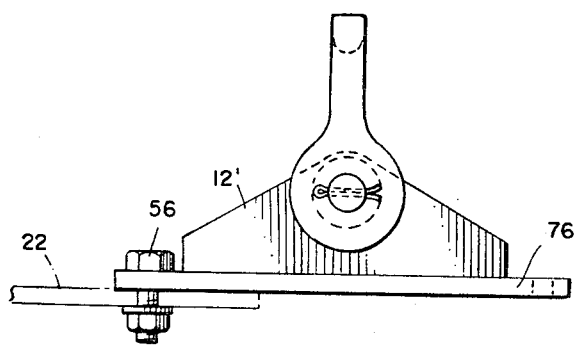
FIG. 10 is a fragmentary elevational view of a lifting lug assembly which is adapted for connection to the apparatus seen in FIG. 5 in place of the swivel assembly seen in FIGS. 3 and 4.

Thus, introduction of pressure fluid to one of the hoses 44 will result in opening or closing of the bowls 24 and 25 depending upon the way the hoses 47–50 are connected. This will be true irrespective of the orientation of the housing 37 relative to the plate assembly 31. The housing 37 is seen to be boltably secured as at 56 to the frame 22. If it is desired that the rotatable feature be omitted, the arrangement of FIG. 10 may be employed where the frame 22 is boltably connected as at 56 to a lifting lug generally designated 121.

Referring again to FIG. 4, the housing 37 is seen to be equipped with a thrust bearing generally designated 57 of the conical type. The bearing is confined in place between a shoulder 38 on the inside of the housing 37 and is supported upon a nut 58 threadably received on the lower portion 42a of the vertical shaft 42. A second bearing is provided as at 59, this also being shown as a conical roller bearing but in some instances, this may be replaced by a bronze sleeve bearing. In the illustration given, the bearing 59 is confined between a second shoulder 60 on the inside of the housing 37 and a second lock nut as at 61. Fixed to the outside of the housing 37 is the sprocket 36 and this fixing can be conveniently achieved by bolts 62 extending through bracket 63, bracket 63 being welded as at 64 to the exterior of the housing 37.

Reference is now made to FIG. 6 in connection with the details of mounting the cylinder and piston rod units 26 and 27 on the frame 22. It will be seen that the cylinder and piston rod units 26 and 27 are arranged in side by side relation but oppositely oriented. In other words, the butt end of the unit 27 is pivotally secured as at 65 while the butt end of cylinder 26 is secured to the other end, i.e., the right hand end of the frame 22 as seen in FIG. 6, as at 66. Relative to the pivotal mounting as at 66, it is seen that a shaft 67 (referring to FIGS. 6–7) extends through the butt end bracket 68 of the cylinder unit 26, the shaft 67 being pivotally secured within lugs 69 and 70 projecting inwardly from an end wall 71 of the frame 22. A similar arrangement is utilized for the mounting at 65 of the cylinder unit 27. Each mounting as at 65 and 66 occupies only a portion of the end of the frame so as to provide space for the connection of the piston rod of the other unit to its associated lever arm 29.

In FIG. 6, i.e., the shaft 67 occupies less than the lower half of the showing while a portion of the upper half is occupied by the connection of piston rod 28 associated with cylinder unit 27. In the extended condition of the piston rod 28, the axis of the piston rod connecting pin 72 is aligned with the axis of the shaft 67 (see FIG. 5).

The arm member 30 previously described in connection with FIG. 5 is seen to include two parts 73 and 74 (see FIGS. 6 and 7) these are spaced on opposite sides of the piston rod 28 and extend downwardly and around a torque tube 75 to which they are secured. The lower extensions of the arms 73 and 74 are equipped with a mounting plate or bracket 76 for attaching the same to the frame 22 by means of the previously referred to bolt 56 (see also FIG. 10). The arms 73 and 74 are fixed to the torque tube 75 in the fashion seen in FIG. 8 so that the axis of the torque tube 75 provides the fulcrum of the lever action defined by the movement of the piston rod 28 over the arc 28a (see FIG. 1).

The torque tube 75 is itself mounted on a shaft tube 77 (seen only in FIG. 8) and coupled thereto by spacer rings as at 78. The shaft tube 77 rides on a nylon bushing 79 which in turn is carried by a fixed rod 80. The rod 80 is pinned as at 81 to the frame 22 and the corresponding rod 82 (see FIG. 6) is coupled to the rod 80 by means of a link 84 (see FIG. 5). Thus, the torque tubes 75 and 83 transmit the work done by the cylinder piston rod 28 to the bowl 24 and 25.

For the purpose of assuring synchronous bowl movement I further interconnect the torque tubes by a mechanical equalizing link as at 85 (see FIG. 5) which has ends connected to lever arms 86 and 87 provided on torque tubes 75 and 83, respectively (see the central portion of FIG. 6). There it will be noticed that the equalizing link 85 lies on the longitudinal center line of the frame 22.

Figure 4:
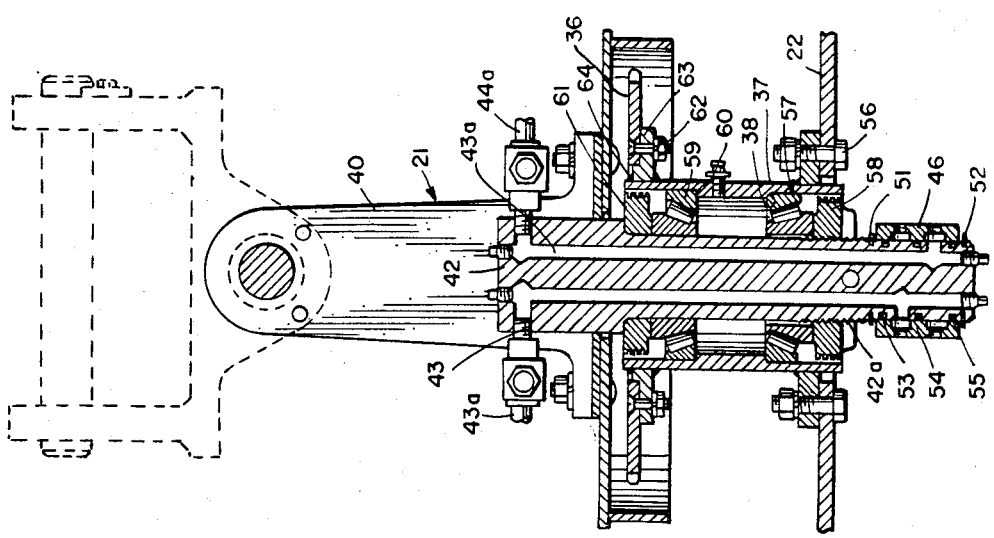
FIG. 4 is a sectional view taken along the sight line 4—4 as applied to FIG. 3.

In the operation of the apparatus, the user has his option of employing the 360° swivel connection 21. If rotational movement of the clam shell bowls, grapple, etc. is not required the shackle arrangement of FIG. 10 can be employed. Other variations such as elongated connections may also be advantageously employed. Where however, rotation of the grasping unit 23 is desired, the swivel unit of FIGS. 3 and 4 is used. For that purpose, the fitting 38 is secured to a backhoe stick in the manner seen in FIG. 1 and the piping connections as at 44 and 45 made for the swivel unit 21 and the hydraulic motor 32 respectively. The connections from the depending shaft 42 (see FIGS. 4 and 9) are made in the fashion seen in FIG. 9 to the two ends of both cylinder units 26 and 27. Thus, power to the motor 32 results in rotation of the sprocket 33 and through the chain 35 results in rotation of the larger sprocket 36 (see FIG. 4). Rotation of the sprocket 36 is accompanied by rotation of the housing 37 and since this is fixed to the top of the frame 22, the entire clam shell unit rotates also. This permits positioning of a clam shell unit in any desired angular orientation.

To operate the clam shell unit, i.e., open and close the bowls 24 and 25, pressure fluid is delivered through one line 44 and withdrawn through the other line 44 depending upon the bowl movement desired. The pressure fluid for example, may flow downwardly through passage 43 and upwardly into passage 43a delivering pressure fluid to one end of each cylinder unit and withdrawing it from the other end to provide movement of the piston rods 28.

As the frame 22 swings under the influence of the motor 32, positive provision is made for the corresponding movement of the rotary seal 46 (see FIGS. 3 and 4). This consists of providing a depending bar 88 slotted as at 89 which engages a radially extending pin 90 on the rotary seal unit 46 (see and compare FIGS. 3 and 9).

The apparatus accommodates a wide range of bowl sizes. By merely loosening eight bolts and dropping off the bowls, other sized clam shell bowls, as well as pole and pulp wood grapple tines can be bolted underneath the frame—all interchangeably.

While in the foregoing specification a detailed description of the embodiment of the invention has been set down for the purpose of illustration, many variations in the details herein given may be made by those skilled in the art without departing from the spirit and scope of the invention.

I claim:

1. Material handling apparatus adapted to be secured to a boom or the like comprising a frame, a pair of hydraulic cylinder and piston rod units mounted in said frame in side by side relation, first pivot means securing the cylinder end of one of said units adjacent one end of said frame and second pivot means securing the cylinder end of the other unit adjacent the other end of said frame whereby said units are oppositely oriented, a pivot shaft rotatably mounted at each end of said frame extending transversely of said units and spaced laterally of said units, arm means coupled to each shaft and its associated piston rod, said arm means being equipped with means for mounting a clam shell bowl or the like, and means for simultaneously providing said units with hydraulic fluid for rotating said arm means cooperatively, said providing means including a housing secured to said frame and equipped with sprocket means fixed thereto, a plate assembly equipped with a depending shaft, said housing being rotatably supported on said shaft, motor means on said plate assembly for turning said sprocket means and therefore said housing and frame, fluid passage means in said depending shaft, and rotary seal and conduit means coupling said passage means with said units whereby operation of said motor means is adapted to rotate said frame without rotational movement of said plate assembly.

2. Material handling apparatus adapted to be secured to a boom or the like comprising a frame, a pair of hydraulic cylinder and piston rod units mounted in said frame in side by side relation, first pivot means securing the cylinder end of one of said units adjacent one end of said frame and second pivot means securing the cylinder end of the other unit adjacent the other end of said frame whereby said units are oppositely orineted, a pivot shaft rotatably mounted at each end of said frame extending transversely of said units and spaced laterally of said units, arm means coupled to each shaft and its associated piston rod, said arm means being equipped with means for mounting a clam shell bowl or the like, and means for simultaneously providing said units with hydraulic fluid for rotating said arm means cooperatively, each pivot shaft being equipped with a torque tube concentric thereto, said arm means including lever arms for each unit, each lever arm couplnig a torque tube to its associated piston rod with said arm means also coupling the last mentioned torque tube to its associated mounting means.

3. The structure of claim 2 in which a link interconnects said torque tubes for synchronous movement of said arm means.

References Cited

UNITED STATES PATENTS

| | | | |
|---|---|---|---|
| 2,136,890 | 11/1938 | Roberts | 294—70 X |
| 2,903,294 | 9/1959 | Shook | 294—88 |
| 3,041,755 | 7/1962 | Ferwerda | 294—70 X |

GERALD M. FORLENZA, *Primary Examiner.*

F. E. WERNER, *Assistant Examiner.*